Dec. 2, 1952 G. E. DATH 2,620,180
FRICTION SHOCK ABSORBER FOR RAILWAY CAR TRUCKS
Filed Oct. 3, 1949 2 SHEETS—SHEET 1
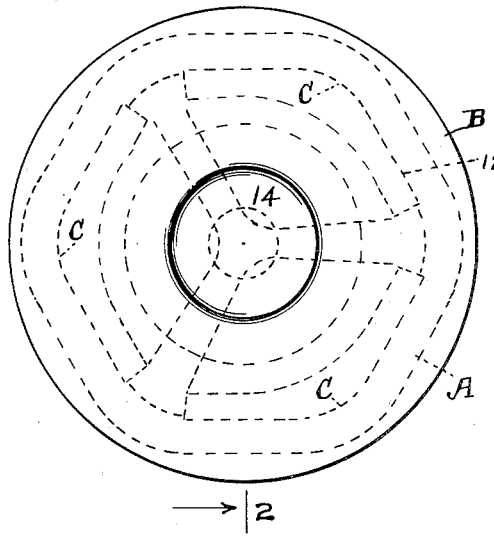
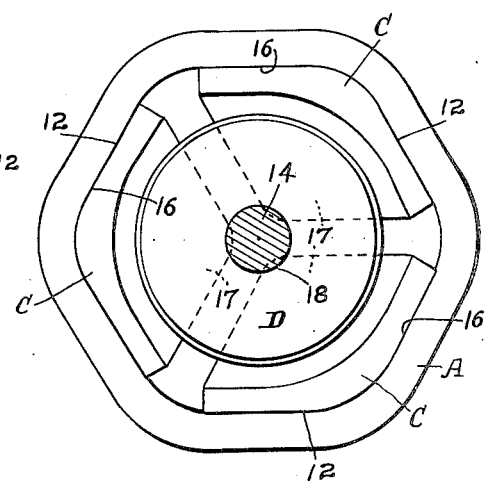
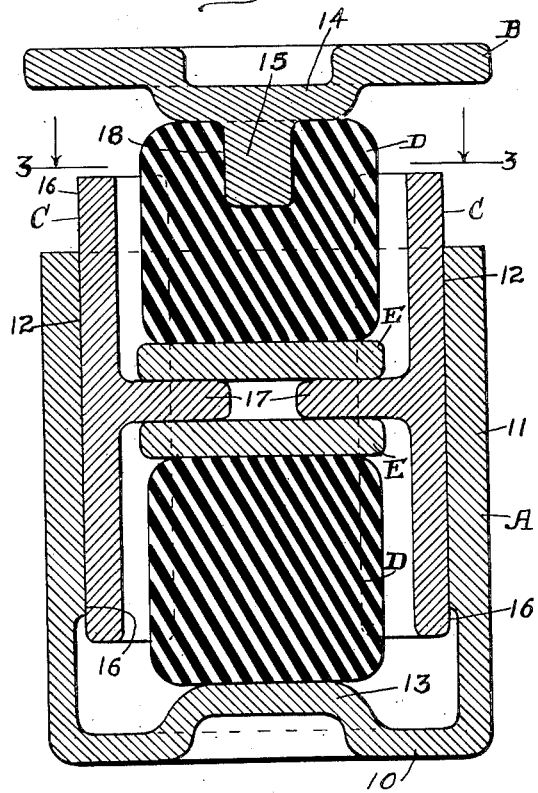
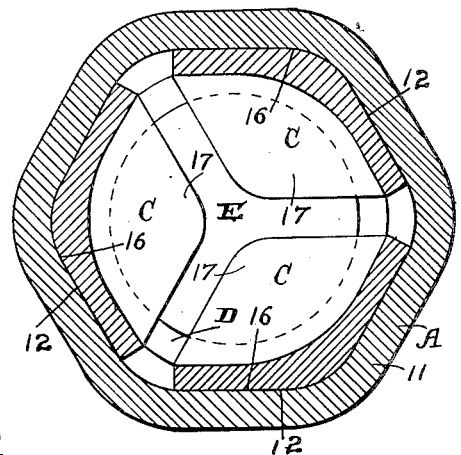
Inventor:
George E. Dath
By
Henry Fuchs
Atty.

Dec. 2, 1952 — G. E. DATH — 2,620,180
FRICTION SHOCK ABSORBER FOR RAILWAY CAR TRUCKS
Filed Oct. 3, 1949 — 2 SHEETS—SHEET 2
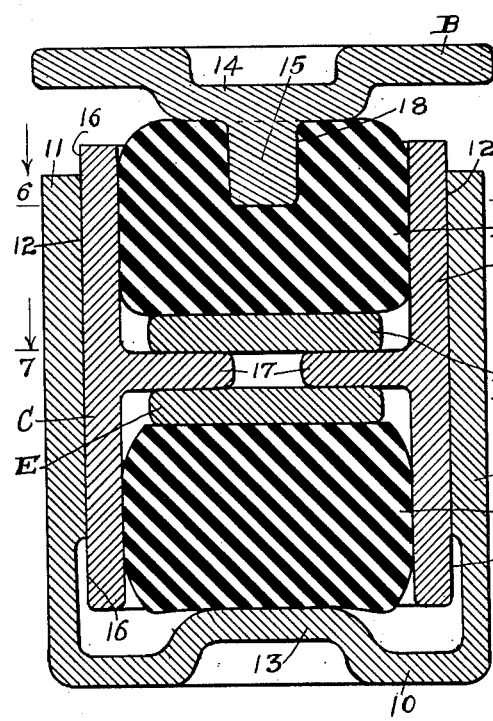
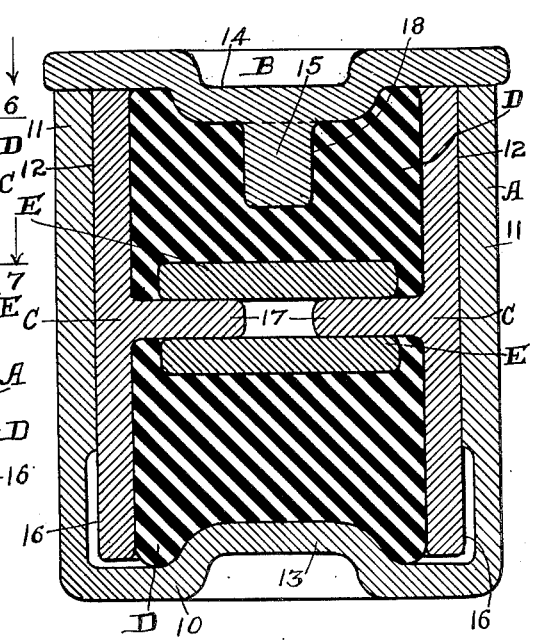
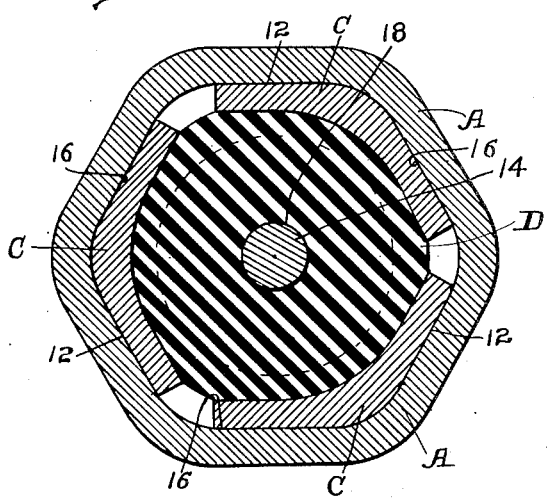
Inventor:
George E. Dath.
By Henry Fucks.
Atty.

Patented Dec. 2, 1952

2,620,180

UNITED STATES PATENT OFFICE 2,620,180

FRICTION SHOCK ABSORBER FOR RAILWAY CAR TRUCKS

George E. Dath, Mokena, Ill., assignor to W. H. Miner, Inc., Chicago, Ill., a corporation of Delaware Application October 3, 1949, Serial No. 119,278

7 Claims. (Cl. 267—9)

1

This invention relates to improvements in friction shock absorbers, especially adapted for use in connection with railway car trucks for snubbing or dampening the action of the truck springs.

One object of the invention is to provide a friction shock absorber, including a friction casing, friction shoes slidingly telescoped within the casing, a follower movable toward and away from the casing, and yielding means in the form of rubber blocks opposing movement of said follower toward said casing and said shoes inwardly of the casing, wherein the rubber blocks are compressed lengthwise of the mechanism during compression of the latter to provide yielding resistance, and during said compression of the mechanism are flattened to be expanded against the shoes after a predetermined amount of compression of the mechanism, to press the shoes apart into intimate frictional contact with the interior walls of the casing to furnish high shock absorbing capacity during the last part of the compression stroke of the device.

A further object of the invention is to provide a friction shock absorbing mechanism having relatively soft cushioning action during the first half of the compression stroke, provided by rubber elements compressible lengthwise of the mechanism, and high shock absorbing capacity during the last half of the compression stroke provided by relatively lengthwise movable, interengaging friction elements pressed into intimate frictional contact with each other by lateral expansion of said rubber elements as they are flattened during compression in lengthwise direction.

A more specific object of the invention is to provide a friction shock absorbing mechanism, comprising a friction casing open at one end and closed at the other end by a transverse wall, friction shoes slidingly telescoped within the open end of the casing, a follower movable lengthwise of the mechanism toward and away from said casing, laterally inwardly projecting abutment flanges on said shoes midway between the ends of the latter, and rubber blocks between said shoes, one reacting between said follower and flanges of the shoes, and the other reacting between said flanges of the shoes and the transverse wall of the casing, said blocks yieldingly opposing movement of said follower inwardly toward the casing, to provide cushioning action, wherein, in the full lengthwise expanded condition of the mechanism, considerable clearance is provided between the rubber blocks and the inner sides of the shoes, whereby, during com-

2 pression of the mechanism, relatively soft cushioning action is provided by lengthwise compression of the rubber blocks until the blocks become flattened to a sufficient extent to take up the clearance and press the shoes laterally against the interior walls of the casing, thus providing high shock absorbing capacity during the remainder of the compression stroke, due to compression of said rubber blocks, augmented by the frictional resistance provided by relative lengthwise movement of the shoes with respect to the casing.

Other objects of the invention will more clearly appear from the description and claims hereinafter following.

In the accompanying drawings forming a part of this specification, Figure 1 is a top plan view of the improved shock absorber. Figure 2 is a vertical sectional view, corresponding substantially to the line 2—2 of Figure 1. Figure 3 is a horizontal sectional view, corresponding substantially to the line 3—3 of Figure 2, with the top rubber block omitted. Figure 4 is a view similar to Figure 2, showing the mechanism partly compressed. Figure 5 is a view similar to Figure 2, showing the mechanism fully compressed. Figures 6 and 7 are horizontal sectional views, corresponding, respectively, to the lines 6—6 and 7—7 of Figure 4.

As shown in the drawings, my improved shock absorber comprises broadly a friction casing A, a top follower B, three friction shoes C—C—C, top and bottom rubber blocks D—D, and top and bottom follower plates or discs E—E.

The casing A is in the form of a tubular member of substantially hexagonal, transverse cross section. The casing A is open at its upper end and has a transverse bottom wall 10 at its lower end. At the upper end portion of the casing, the walls of the latter are inwardly thickened to provide a friction shell section 11. The friction shell section 11 presents three longitudinally extending, interior friction surfaces 12—12—12 of V-shaped, transverse cross section, parallel to the central, longitudinal axis of the casing. The bottom wall 10 of the casing is provided with an upstanding, central, hollow boss 13 in which the usual spring centering projection or lug of the lower spring plate of a cluster of truck springs is adapted to be engaged.

The top follower B is in the form of a relatively thick, disclike plate, provided with a downwardly offset, central, hollow boss 14, having a centrally disposed, cylindrical lug 15 depending therefrom. The follower B is disposed above the casing A and is movable toward and away from the latter lengthwise of the mechanism. The hollow boss 14 of the follower B provides a central seat, adapted to accommodate the usual spring centering projection of the top follower plate of a cluster of railway car truck springs.

The shoes C—C—C are of similar design, each shoe being in the form of a heavy, platelike member of V-shaped, transverse section, presenting a lengthwise extending, V-shaped friction surface 16 on its outer side, engaged with one of the V-shaped friction surfaces 12 of the casing A. Midway between its ends, each shoe C has a laterally inwardly projecting, horizontal flange 17 of substantially triangular shape. The flanges 17—17—17 of the three shoes C—C—C project toward the central longitudinal axis of the mechanism and are in horizontal alignment.

The top and bottom follower discs E—E are arranged above and below the flanges 17—17—17 of the shoes, the top disc E resting on the flanges 17—17—17 and the bottom disc E abutting the underneath sides of said flanges.

The rubber blocks D—D are of similar design, each block being in the form of a solid cylinder having substantially flat, top and bottom ends. The bottom rubber block D is arranged between the shoes C—C—C, below the flanges 17—17—17 thereof, resting on the boss 13, and having its upper end bearing on the underneath side of the bottom follower disc E. The top rubber block D is arranged between the shoes C—C—C, with its lower end resting on the top follower disc E and its upper end bearing on the underneath side of the boss 14 of the top follower B. At its upper end, the top block D is provided with a central opening 18 in which the lug 15 of the top follower B is seated, thereby holding the block D properly centered. The two blocks D—D are of considerable smaller diameter than the diameter of the opening between the shoes C—C—C, thus providing substantial clearance between said blocks and the inner sides of the shoes, as illustrated most clearly in Figure 2.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed, the top follower B is forced downwardly with respect to the casing A, compressing the rubber blocks lengthwise of the mechanism, the top block D being compressed between the follower B and the top follower disc E, and the bottom block D being compressed between the bottom disc E and the bottom end wall of the casing A. As the rubber blocks are compressed, the shoes will be carried inwardly of the casing by the flanges 17—17—17, which are engaged between the follower discs E—E. Inasmuch as there is substantial clearance between the rubber blocks D—D and the inner sides of the shoes in the fully lengthwise expanded condition of the mechanism, as shown in Figure 1, the shoes are not pressed against the interior friction surfaces 12—12—12 of the casing during this first stage of the operation of the mechanism, and slide loosely on said friction surfaces. Thus, relatively light cushioning action is provided until flattening out of the rubber blocks D—D, during further compression of the mechanism, spreads the blocks sufficiently to press against the inner sides of the shoes C—C—C, as illustrated in Figure 4, thereby pressing the shoes against the friction surfaces of the casing with resultant increase in shock absorbing capacity, due to frictional resistance to lengthwise movement of the shoes, produced by the contacting friction surfaces of the shoes and casing. The shock absorbing capacity of the mechanism rapidly builds up until the mechanism reaches the completely closed position shown in Figure 5, with the follower B arrested against further movement toward the casing A by engagement with the upper end of the latter. The mechanism is preferably designed and proportioned so that soft cushioning action is produced by the compression of the rubber blocks only during half of the compression stroke of the mechanism, followed by heavy resistance during the remainder of the compression stroke by further compression of the rubber blocks augmented by frictional resistance between the friction surfaces of the shoes and the casing.

I claim:

1. In a friction shock absorber, the combination with a friction casing open at one end; of friction shoes slidingly telescoped within the open end of said casing; a follower movable lengthwise of the mechanism toward and away from said casing; a lengthwise compressible rubber block between said shoes reacting between said follower and shoes to oppose relative movement of said follower and shoes toward each other lengthwise of the mechanism, said block being of lesser diameter throughout its length than the opening between said shoes to provide for substantial clearance between said block and shoes in the fully expanded condition of the mechanism; and a second lengthwise compressible rubber block between said shoes reacting between said casing and shoes to oppose relative movement of said follower and shoes toward each other lengthwise of the mechanism, said last named block being of lesser diameter throughout its length than said opening between said shoes to provide substantial clearance between said block and shoes in the fully expanded condition of the mechanism, said blocks being flattened out during compression of the mechanism to take up said clearance and press the shoes against the interior of said casing.

2. In a friction shock absorber, the combination with a friction casing open at one end; of a follower; friction shoes slidingly telescoped within the casing; and lengthwise compressible rubber means between said shoes, reacting between said follower and casing to oppose movement of said follower toward said casing, said rubber means throughout its length being spaced from the inner sides of the shoes in the fully lengthwise expanded condition of the mechanism to provide a predetermined amount of clearance between said rubber means and the inner sides of the shoes, said rubber means, when compressed lengthwise, being flattened to expand laterally and engage the inner sides of said shoes to press the shoes against the interior walls of the casing.

3. In a friction shock absorber, the combination with a friction casing open at one end and closed by a transverse wall at the other end; of a follower; friction shoes slidingly telescoped within said open end of the casing, said shoes having inwardly projecting flanges between the ends thereof; a follower movable toward and away from said open end of the casing in direction lengthwise of the mechanism; a lengthwise compressible rubber block reacting between said follower and flanges of said shoes; a second lengthwise compressible rubber block reacting between said flanges of the shoes and the transverse end wall of the casing in the fully expanded condition of the mechanism, said blocks being of smaller diameter throughout their lengths than the opening between said shoes and, when flattened by lengthwise compression, being radially expanded to engage the inner sides of said shoes and press the same against the interior walls of the casing.

4. In a friction shock absorber, the combination with a single friction casing open at its upper end and closed by a transverse wall at its bottom end; of a top follower movable lengthwise of the mechanism toward and away from said open end of the casing; friction shoes slidingly telescoped within the said casing only; radially inwardly extending, horizontal flanges on said shoes between the ends of the same; a follower plate supported on said flanges; a rubber block supported on the transverse wall of the casing; a second follower plate suported on said block and bearing on the underneath sides of the flanges of said shoes; and a second rubber block supported on said first named follower plate and bearing at its upper end on said top follower, said rubber blocks, when compressed lengthwise, being flattened out to spread the same against the inner sides of said shoes to press the latter against the interior walls of the casing.

5. In a friction shock absorber, the combination with a single friction casing open at its upper end and closed by a transverse wall at its bottom end; of a top follower movable lengthwise of the mechanism toward and away from said open end of the casing; friction shoes slidingly telescoped within the casing only; radially inwardly extending, horizontal flanges on said shoes between the ends of the same; a follower plate supported on said flanges; a rubber block supported on the transverse wall of the casing; a second follower plate supported on said block and bearing on the underneath sides of the flanges of said shoes; and a second rubber block supported on said first named follower plate and bearing at its upper end on said top follower, both of said rubber blocks being of substantially smaller diameter throughout their lengths than the openings between said shoes to provide clearance between said rubber blocks and the inner sides of said shoes in the fully lengthwise expanded condition of the mechanism, said rubber blocks, when compressed to a predetermined extent during compression of the mechanism, being flattened to spread the same against the inner sides of the shoes to press the latter against the interior walls of the casing.

6. In a friction shock absorber, the combination with a friction casing open at its upper end and closed at its bottom end by a transverse wall, said casing having lengthwise extending, interior friction surfaces at said open end; of friction shoes slidingly telescoped within said open end of the casing, said shoes having lengthwise extending friction surfaces on the outer sides contacting the friction surfaces of said casing; radially inwardly projecting, horizontal flanges on said shoes between the ends of the latter; a top follower movable lengthwise of the mechanism toward and away from said casing; a top follower disc bearing on the upper sides of said flanges; a bottom follower disc bearing on the underneath sides of said flanges; a vertically disposed, cylindrical rubber block between said shoes supported on said top disc and bearing at its upper end on said top follower; and a second vertically disposed, cylindrical rubber block supported on said transverse bottom wall of the casing and bearing at its upper end on the underneath side of said bottom disc, said blocks being flattened out to expand radially against said shoes, when compressed lengthwise, during compression of the mechanism, to press said shoes tightly against the friction surfaces of the casing.

7. In a friction shock absorber, the combination with a friction casing open at its upper end and closed at its bottom end by a transverse wall, said casing having lengthwise extending, interior friction surfaces at said open end; of friction shoes slidingly telescoped within said open end of the casing, said shoes having lengthwise extending friction surfaces on the outer sides contacting the friction surfaces of said casing; radially inwardly projecting, horizontal flanges on said shoes between the ends of the latter; a top follower movable lengthwise of the mechanism toward and away from said casing; a top follower disc bearing on the upper sides of said flanges; a bottom follower disc bearing on the underneath sides of said flanges; a vertically disposed, cylindrical rubber block between said shoes supported on said top disc and bearing at its upper end on said top follower; and a second vertically disposed, cylindrical rubber block supported on said transverse bottom wall of the casing and bearing at its upper end on the underneath side of said bottom disc, said blocks being of lesser diameter than the opening between the inner sides of said shoes to provide a predetermined amount of clearance between the outer sides of said blocks and the inner sides of said shoes, in the fully lengthwise expanded condition of the mechanism, said blocks, when flattened during compression of the mechanism, being radially spread into engagement with the inner sides of said shoes to force the latter against the friction surfaces of the casing.

GEORGE E. DATH.

REFERENCES CITED

The following references are of record in the file of this patent:

UNITED STATES PATENTS

| Number | Name | Date |
|---|---|---|
| 1,933,034 | Sproul | Oct. 31, 1933 |
| 2,010,623 | Bugatti | Aug. 6, 1935 |
| 2,205,098 | Lamont | June 18, 1940 |
| 2,263,599 | Tucker | Nov. 25, 1941 |
| 2,306,398 | Light | Dec. 29, 1942 |